(12) United States Patent
Bering

(10) Patent No.: US 11,031,844 B2
(45) Date of Patent: ***Jun. 8, 2021

(54) OFF-BOARD POWER AND IMPLEMENT COUPLER FOR A WORK VEHICLE

(71) Applicant: DEERE & COMPANY, Moline, IL (US)

(72) Inventor: Christopher A. Bering, Dike, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,531

(22) Filed: Aug. 28, 2019

(65) Prior Publication Data
US 2019/0386541 A1    Dec. 19, 2019

(51) Int. Cl.
*B60K 25/08* (2006.01)
*H02K 7/18* (2006.01)
(Continued)

(52) U.S. Cl.
CPC ......... *H02K 7/1861* (2013.01); *A01B 59/002* (2013.01); *A01B 59/043* (2013.01);
(Continued)

(58) Field of Classification Search
CPC .. B60W 10/06; B60W 30/1886; B60W 20/10; B60W 20/16; B60W 10/08;
(Continued)

(56) References Cited

U.S. PATENT DOCUMENTS

| 7,135,785 B2 * | 11/2006 | Kropp ................... B60K 25/06 |
| | | 290/40 C |
| 71,357,858 | 11/2006 | Kropp, et al. |

(Continued)

FOREIGN PATENT DOCUMENTS

DE    202011051914 U1    11/2011
DE    202011051915 U1    11/2011
(Continued)

OTHER PUBLICATIONS

German Search Report, German Patent Application 102018216237.9, dated Apr. 9, 2019, pp. 1-10.

*Primary Examiner* — Toan C To
(74) *Attorney, Agent, or Firm* — Taft Stettinius & Hollister LLP; Stephen F. Rost

(57) ABSTRACT

An implement coupler including an electrical generator configured to generate electric power in response to a mechanical force provided by a power takeoff of a work vehicle. The implement coupler includes a support frame and an adjustment mechanism operatively connected to the support frame, wherein the adjustment mechanism is configured to adjust the position of the support frame with respect to the work vehicle. The generator is located on the support frame and is operatively connected to the power takeoff. The implement coupler further includes a drive shaft connected to the power takeoff and to the generator, an electrical coupler electrically coupled to the generator to provide access to the generated electrical power wherein the electrical coupler includes an output configured to provide the generated electrical power, and a line coupler including a connector configured to couple to source of material and to deliver the material.

19 Claims, 7 Drawing Sheets

(51) Int. Cl.
*A01B 59/06* (2006.01)
*A01B 71/06* (2006.01)
*A01B 59/00* (2006.01)
*A01B 59/043* (2006.01)
*A01B 76/00* (2006.01)
*B62D 49/06* (2006.01)

(52) U.S. Cl.
CPC .......... *A01B 59/062* (2013.01); *A01B 59/067* (2013.01); *A01B 71/06* (2013.01); *A01B 76/00* (2013.01); *B62D 49/065* (2013.01)

(58) Field of Classification Search
CPC ... B60W 2710/086; B60W 2510/0666; B60W 10/26; B60W 2300/17; B60W 2530/12; F01N 3/2066; F01N 3/103; F02D 29/06; F02B 63/04; Y10S 903/906; B60Y 2200/412; B60Y 2300/472; B60Y 2300/476; Y02T 10/54; Y02T 10/6286
USPC .................. 180/53.6, 53.61, 53.62, 53.7
See application file for complete search history.

(56) References Cited

U.S. PATENT DOCUMENTS

| | | | |
|---|---|---|---|
| 9,155,247 B1 | 10/2015 | Force | |
| 10,075,044 B1 * | 9/2018 | Watson | F02B 63/042 |
| 10,404,137 B2 * | 9/2019 | Bering | H02K 7/1861 |
| 2006/0289179 A1 | 12/2006 | Irvin et al. | |
| 2007/0169951 A1 | 7/2007 | Clement et al. | |
| 2011/0204712 A1 * | 8/2011 | Tarasinski | A01B 59/06 307/9.1 |
| 2012/0085836 A1 * | 4/2012 | Tiu | A01M 7/0014 239/77 |
| 2012/0247846 A1 * | 10/2012 | Ichikawa | B60H 1/00207 180/65.21 |
| 2014/0251697 A1 * | 9/2014 | Jones | E21B 7/027 175/382 |
| 2014/0278696 A1 * | 9/2014 | Anderson | G06Q 10/06313 705/7.23 |
| 2015/0266382 A1 * | 9/2015 | Penmetsa | B60L 1/003 307/10.1 |
| 2016/0046278 A1 * | 2/2016 | Matsuzaki | B60L 58/13 701/22 |
| 2016/0252144 A1 * | 9/2016 | Kajino | B60R 25/04 701/67 |
| 2016/0319505 A1 | 11/2016 | Hensley | |
| 2017/0203645 A1 * | 7/2017 | Imai | B60K 6/46 |
| 2017/0203748 A1 * | 7/2017 | Imai | B60W 10/26 |
| 2018/0363376 A1 * | 12/2018 | Jones | E21B 7/028 |

FOREIGN PATENT DOCUMENTS

| | | |
|---|---|---|
| DE | 202011106833 U1 | 2/2012 |
| DE | 102011055192 A1 | 5/2014 |
| DE | 102015208077 A1 | 11/2016 |

\* cited by examiner

OFF-BOARD POWER AND IMPLEMENT COUPLER FOR A WORK VEHICLE

CROSS-REFERENCE TO RELATED APPLICATION

This application is a continuation application of U.S. patent application Ser. No. 15/791,810, filed Oct. 24, 2017, having the title "Off-Board Power and Implement Coupler for a Work Vehicle", which is hereby incorporated by reference in its entirety.

FIELD OF THE DISCLOSURE

The present invention generally relates to an implement coupler for a work vehicle, and more particularly to a quick coupler hitch for a tractor.

BACKGROUND

Work vehicles are configured to perform a wide variety of tasks for use as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field. Tractors often include a power takeoff (PTO) which includes a shaft coupled to the transmission and driven by the engine to provide mechanical power to a work implement being pulled or pushed through a field by the tractor.

Implement couplers, such as quick coupler hitches, have been developed to allow faster attachment of a tractor's three point hitch to a rear mounted implement. Quick coupler hitches may include an inverted U-shaped frame attached to a conventional three point hitch. The frame of a quick coupler hitch may have an upper hook and two lower coupling hooks or jaws with a latching and unlatching arrangement to hold the implement hitch pins. To hook up a quick coupler hitch to an implement, the hitch may be lowered and the tractor backed into place near the implement. The quick coupler hitch is then raised with the tractor's hydraulic system so that the upper hook engages the upper pin on the implement. Further lifting causes the implement's lower hitch pins to enter the lower hooks of the quick coupler.

The PTO that extends from the tractor to the implement is directly coupled to the implement to drive an operation being performed by the implement. In different embodiments, the implements include a spreader, a rotary mower, a rotary tiller, and other types of implements. The implement receives rotary power from the PTO to drive the operation of particular implement to which the tractor is connected. While these types of implements are configured to operate from the mechanical rotary power provided by the PTO, these and other types of implements can and will have electrical power requirements that need to be provided by either the tractor or the implement itself. In some cases, the electrical needs of the implement may exceed the power available from the tractor itself.

In this case, what is needed is an implement coupler that is configured to provide electrical power to the implement.

SUMMARY

In one embodiment there is provided an implement coupler for a work vehicle including a power takeoff configured to provide a mechanical force and an adjustment mechanism to adjust the position of the implement coupler with respect to the work vehicle. The implement coupler includes a support frame and a drive shaft supported by the support frame. The drive shaft includes an input to couple to the power takeoff; wherein the drive shaft is configured to transfer mechanical force provided by the power takeoff. A generator is supported by the support frame and is operatively connected to the drive shaft, wherein the generator is configured to generate electrical power based on the mechanical force provided through the drive shaft.

In another embodiment, there is provided an implement coupler for a work vehicle including a power takeoff configured to provide a mechanical force and an adjustment mechanism to adjust the position of the implement coupler with respect to the work vehicle. The implement coupler includes a support frame and a gear assembly supported by the support frame and operatively connected to the power takeoff. The gear assembly moves in response to the mechanical force provided by the power takeoff. A first generator is supported by the support frame and is operatively connected to the gear assembly, wherein the first generator generates a first electrical power in response to movement of the gear assembly. A second generator is supported by the support frame and is operatively connected to the gear assembly, wherein the first generator generates a second electrical power in response to movement of the gear assembly.

In still another embodiment, there is provided a method a method of generating electrical power for a work implement connected to a work vehicle having an adjustment mechanism and a power takeoff. The method includes: receiving a rotational mechanical force provided by the power takeoff at a gear assembly of an implement coupler having connectors coupled to the adjustment mechanism; generating in response to the received rotational mechanical force a first electrical power at a first generator located at the implement coupler and coupled the gear assembly; generating in response to the received rotational mechanical force a second electrical power at a second generator located at the implement coupler and coupled to the gear assembly; and providing the first electrical power and the second electrical power to the work implement though respective first and second power connectors connected to the work implement.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
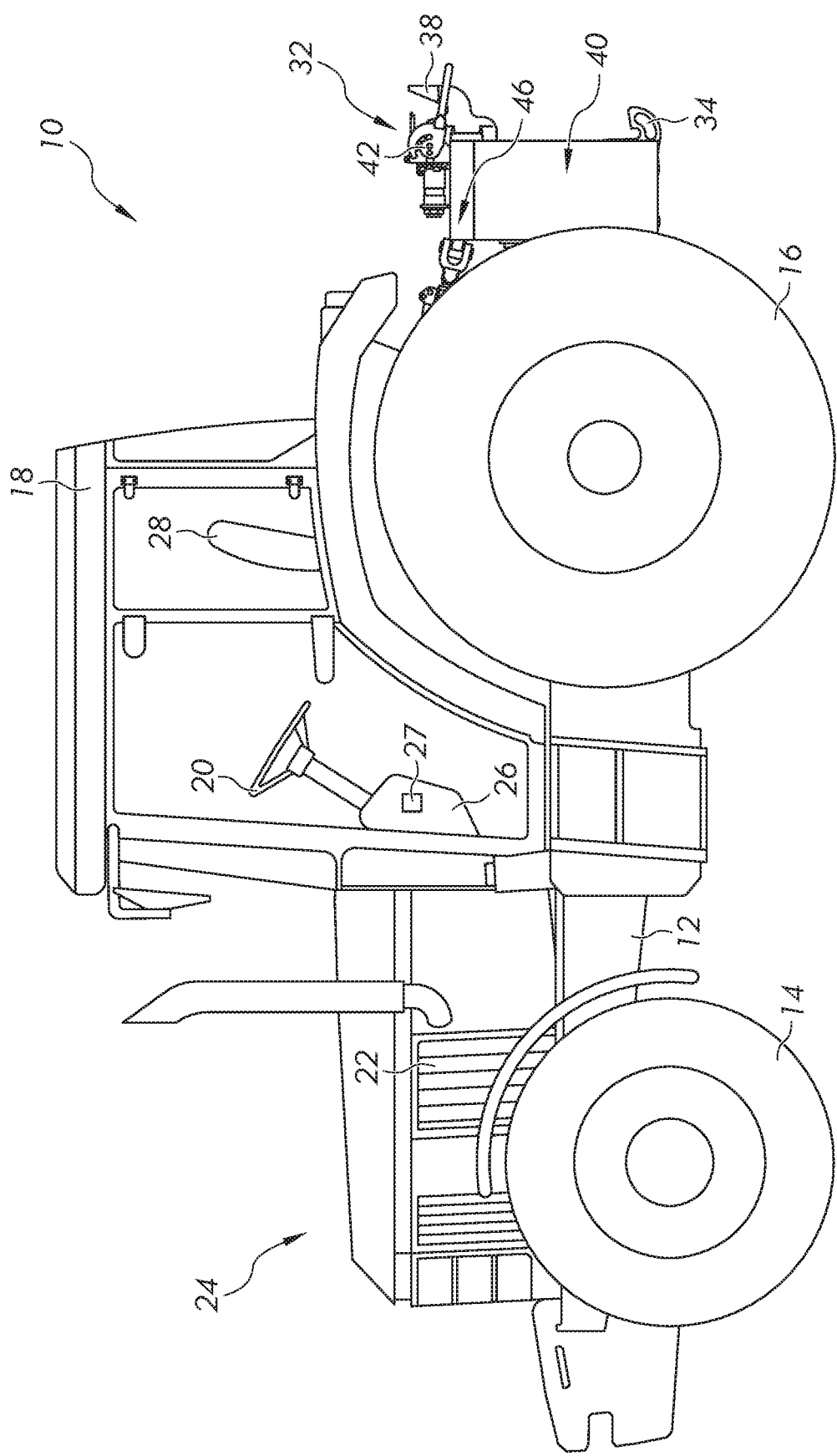
FIG. 1 is an elevational side view of a work vehicle, and more specifically, of an agricultural vehicle such as a tractor, including an implement coupler.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 is an elevational side view of an agricultural vehicle, and more particularly a tractor 10, including a frame 12 supported on a pair of front wheels 14 and a set of rear wheels 16. While wheels are described in the embodiments, other ground engaging traction devices, including tracks, are contemplated. An operator cab 18 is mounted on the frame 12 and contains various controls for the vehicle 10 so as to be within the reach of a seated or standing operator. In one aspect, these controls may include a steering wheel 20. A prime mover 22, such as an engine, is mounted on the frame 12 beneath a housing 24 and supplies power for driven components of the tractor 10. The engine 22, for example, is configured to drive a transmission (not shown), which is coupled to drive the wheels at various selected speeds and either in forward or reverse directions. In different embodiments, the front wheels, the rear wheels, or all of the wheels are driven in an all-wheel drive mode to move the tractor 10.

While the described embodiments are discussed with reference to a tractor, in addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation 26, which is supported by the frame 12. The cab 18 also encloses a seat 28 for seating the operator. The operator workstation 26, in different embodiments, includes one or more of an operator user interface 27 including, but not limited to, a steering wheel, a joystick, an accelerator pedal, and a power take-off (PTO) control device for turning on or off the PTO. Pedals for a brake and a clutch are also located in the cabin 18, but are not shown.

The user interface includes a plurality of operator selectable buttons configured to enable the operator to control the operations and functions of the tractor 10. The user interface, in one embodiment, includes a user interface device including a display screen having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons.

An implement coupler 32 is partially shown in FIG. 1 and further described in FIGS. 2-8. The implement coupler 32 is coupled to the frame 12 and extends from the rear of the vehicle 10. The implement coupler 32 is configured as a three-point hitch including a first lower connection point 34, a second lower connection point 36, and an upper connection 38. Each of the connection points 34, 36, and 38 are displaced appropriately from one another to provide a three point hitch configuration to engage similarly placed connection points on implement as is understood by one skilled in the art. Each of the connection points is fixedly coupled to a support frame 40 which is movable with respect to the tractor 10. A line coupler 42 and one or more electrical couplers 44 are fixedly coupled to a top part 46 of the support frame 40. A support frame housing 48 is fixedly coupled to the housing 40 and is configured to support one or more electrical generators and related components as described later herein. In different embodiments, control of the functions of the implement coupler is made through the user interface 27. The one or more electrical generators are considered to be "off-board" or not located on the work vehicle itself.

As further illustrated in FIGS. 2-5, the support frame 40 is positionable with respect to the tractor 10 by being operatively connected to a housing 50 which is fixedly coupled to the frame 12 of the vehicle 10. The housing 50, in one embodiment, is a cast housing which supports an adjustment mechanism 52 including a first lift arm 54 and a second lift arm 56 each of which is rotatably coupled to the housing 50 at a longitudinal axis of a support shaft 58. The support shaft 58 extends from a first side 60 to a second side 62 of the housing 50 at a top portion thereof and provides structural support for the sides 60 and 62. The shaft 58 extends between and through the sides 60 and 62 where terminating ends 64 and 66 of the cylinder provide rotational support for each of the arms 54 and 56. Terminating end 64 provides rotational support for first lift arm 54 and terminating end 66 provides rotation support for second lift arm 56. A center link 57 is operatively connected to the housing 50 and the top portion 46 of the support frame 40. The center link 57 adjusts the housing 40 to lean toward or away from the tractor 10.

Each of the lifts arms 54 and 56 extend from the shaft 58 and each have a terminating end respectively coupled to a first lift link 70 and a second lift link 72. The first lift link 70 is also coupled to a first draft link 74. The second lift link 72 is coupled to a second draft link 76 (not shown). As seen FIG. 3, the first draft link includes a first end 78 rotatably coupled to the support frame 50 and a second end 80 rotatably coupled to the housing 40. The draft link 74 and draft link 76 are similarly configured such that draft line 76 is similarly rotatably coupled to the support frame 50 and housing 40.

Figure 2:
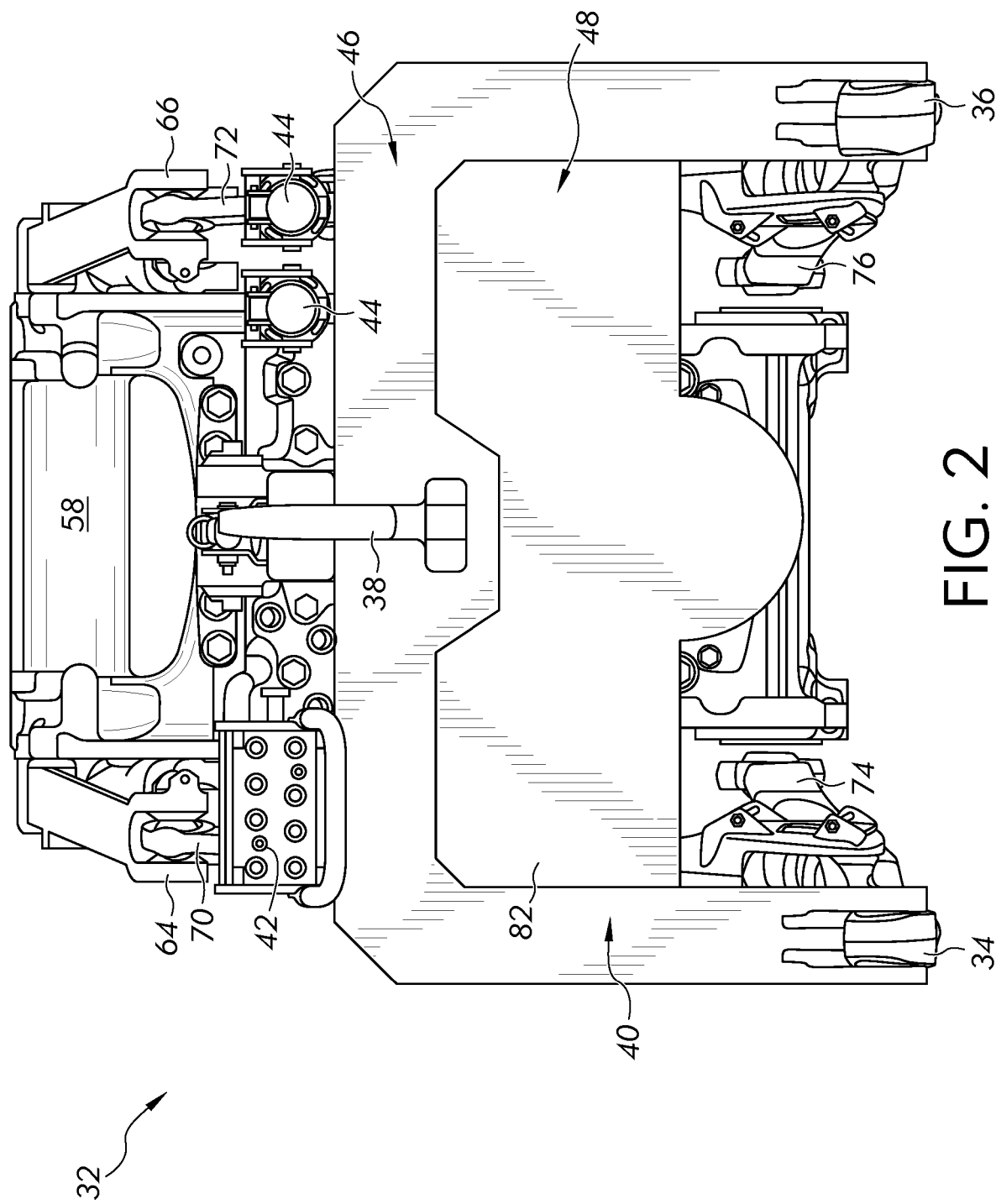
FIG. 2 is an elevational front view of an implement coupler for a work vehicle.
Figure 3:
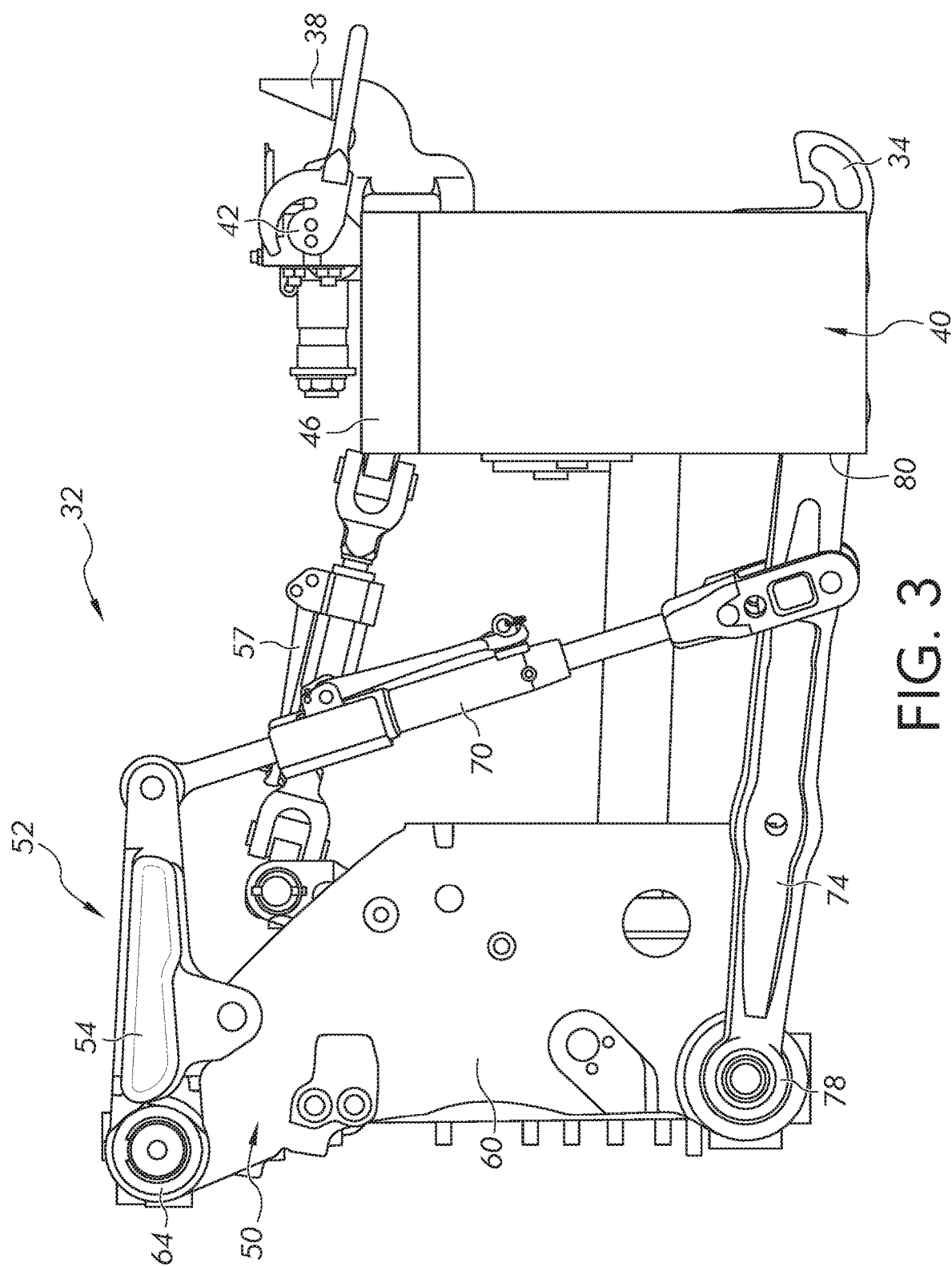
FIG. 3 is an elevational side view of an implement coupler for a work vehicle.
Figure 4:
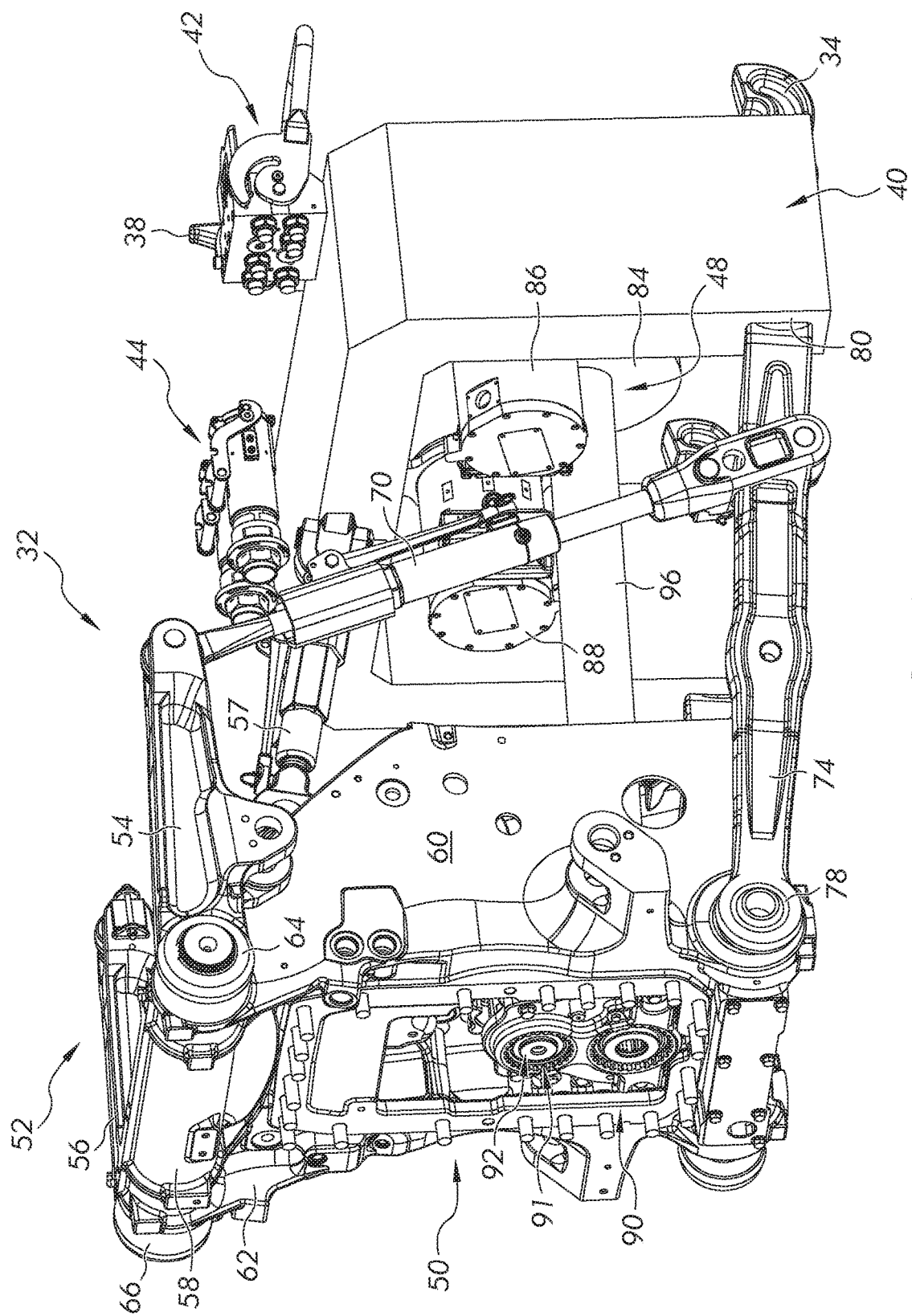
FIG. 4 is a rear perspective view of an implement coupler for a work vehicle.

The support frame housing 48 includes a first side 82, as shown in FIG. 2 and a second side 84 as shown in FIG. 4. A first generator 86 and a second generator 88 are fixedly coupled to the support frame housing 48 and each have a portion thereof (now shown) located between the first side 82 and the second side 84. A generator housing of each of the first and second generators 86 and 88, in one embodiment, is connected to the second side 84, by one or more couplers, such as bolts to insure that the generators 86 and 88 remain fixed to the support frame housing 48 at a predetermined location.

Figure 5:
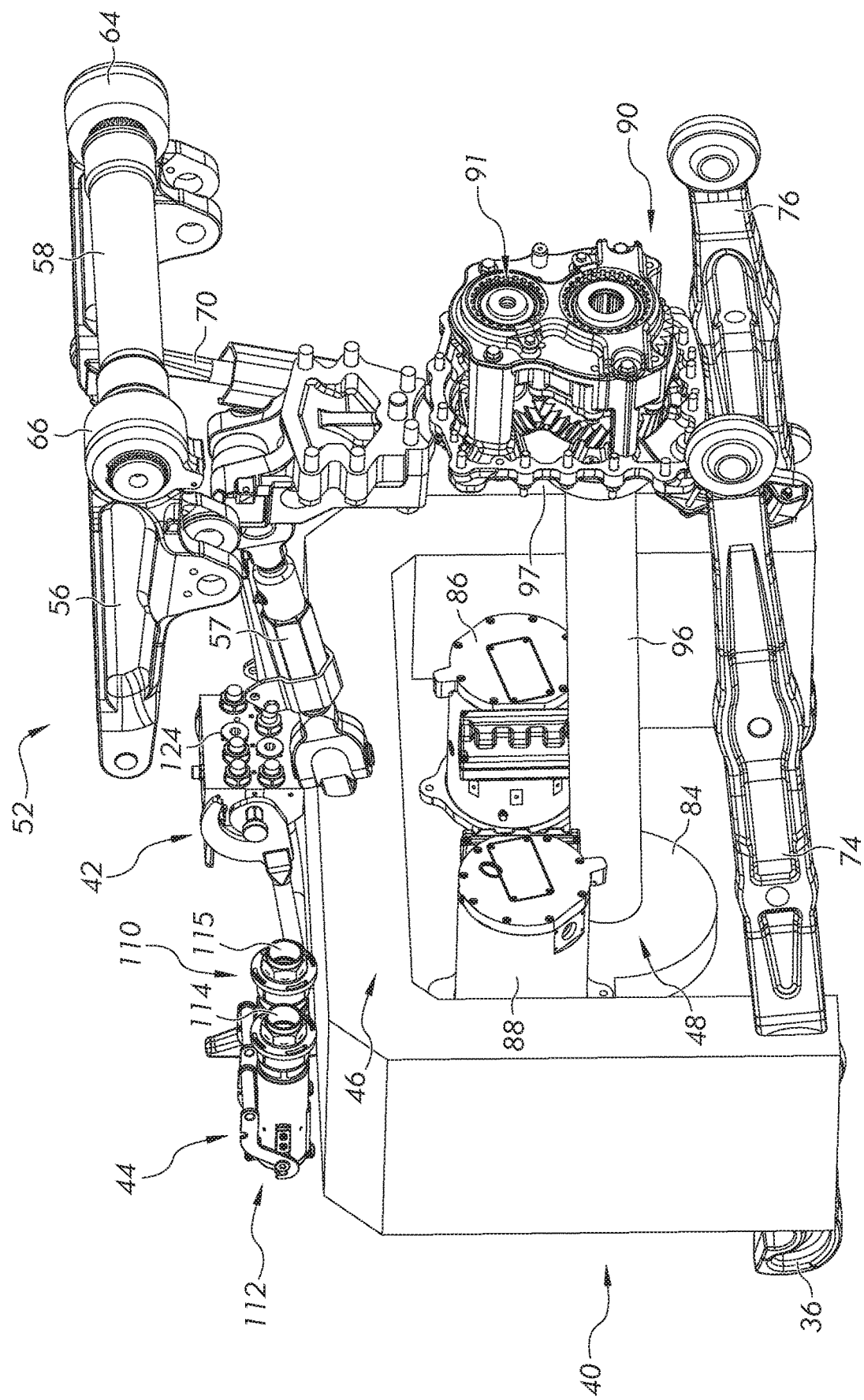
FIG. 5 is a partial rear perspective view of an implement coupler for a work vehicle.
Figure 6:
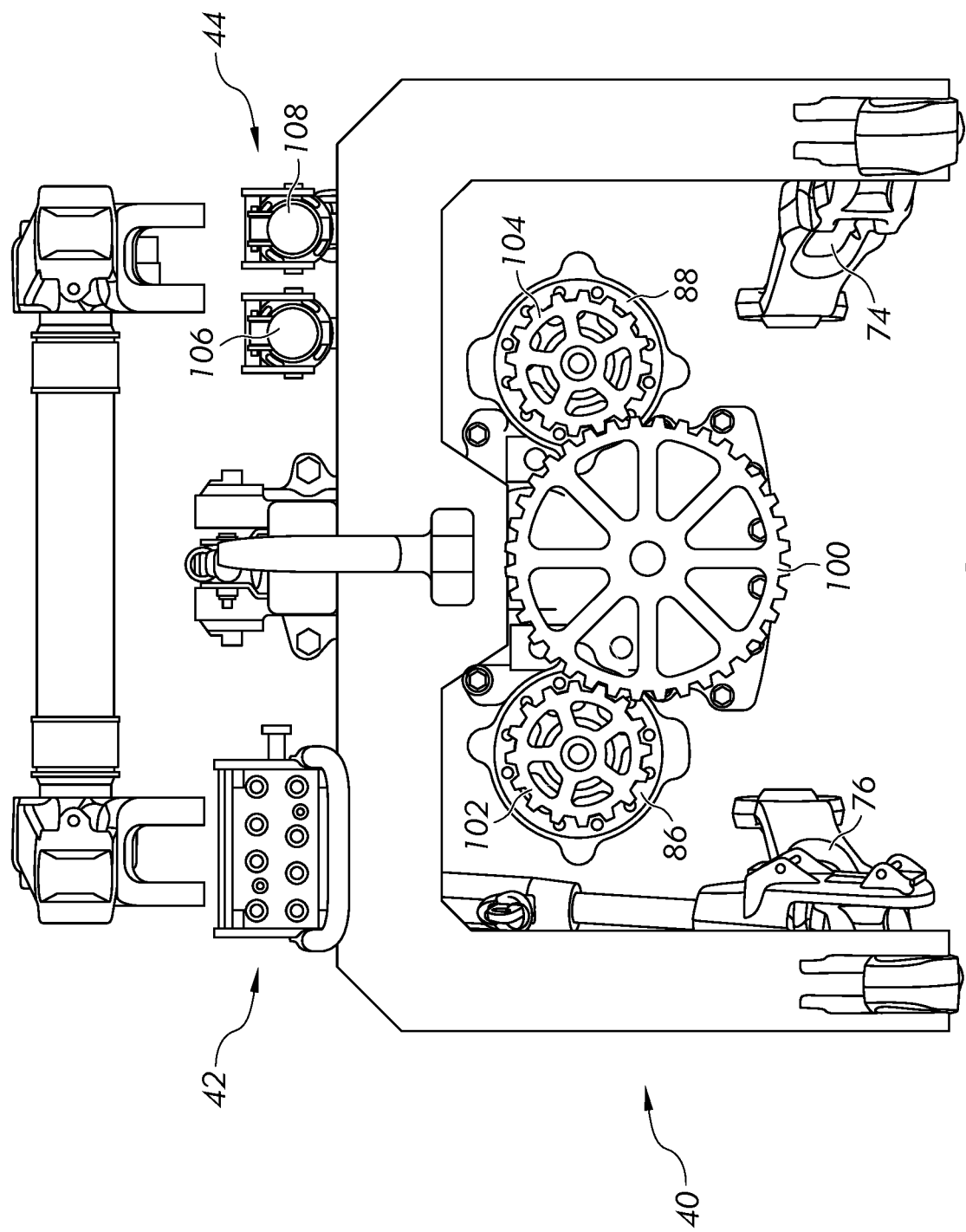
FIG. 6 is a partial elevational front view an implement coupler for a work vehicle.

As can be seen in FIGS. 4 and 5, the implement coupler 32 includes a PTO gearbox 90 that is configured to couple to the PTO of the tractor. The PTO gearbox 90 is supported by the housing 50 between the sides 60 and 62. The tractor PTO is coupled to and extends from the tractor to connect with an input drive 91, which is rotatably driven by the tractor PTO. The input drive 91 transfers the rotational mechanical energy of the PTO to the generators 86 and 88. In different embodiments, the gearbox includes one or more of a clutch, a one speed assembly, a two speed assembly, and a three speed assembly. In different embodiments, the gearbox 90 includes gear drives, belt drives, chain drives, or combinations thereof.

As can be seen in both FIG. 4 and FIG. 5, the drive shaft 96 extends from a second side 97 of the PTO coupler 90 and through the second side 84 of the frame housing 48. The terminating end of the drive shaft 96 which extends through the second side 84 is operatively connected to a generator drive gear 100 (see FIG. 6) which is rotatably driven by the drive shaft 96. The drive gear 100, in turn, rotatably drives a first driven gear 102 and a second driven gear 104 each of which are operatively connected to the generators 86 and 88. The drive gear 100, the first driven gear 102, and the second driven gear 104 are configured as a gear assembly. Each of the generators generates electrical power during rotational movement of the drive shaft 96. The generator power is made available to an operator of the work vehicle 10 or to an operator of the work implement through the electrical coupler 44 which includes a first electrical coupler 106 and a second electrical coupler 108 each of which is electrically coupled to one of the generators through an electrical cable (not shown). In one embodiment, the couplers 106 and 108 are fixedly coupled to the top portion 46. Other locations of the couplers are contemplated.

In one embodiment, the first driven gear 102 and the second driven gear are of the same size and include the same tooth profile to drive each of the generators 86 and 88 at the same rate to generate the same electrical power. In another embodiment, the first driven gear 102 and the second driven gear are of different sizes and/or include different tooth profiles such that the generators 86 and 88 generate a different amount of electrical power. In still other embodiments, the gears of each of the generators 86 and 88 are the same or different to provide a predetermined output electrical power which is the same or different.

Figure 7:
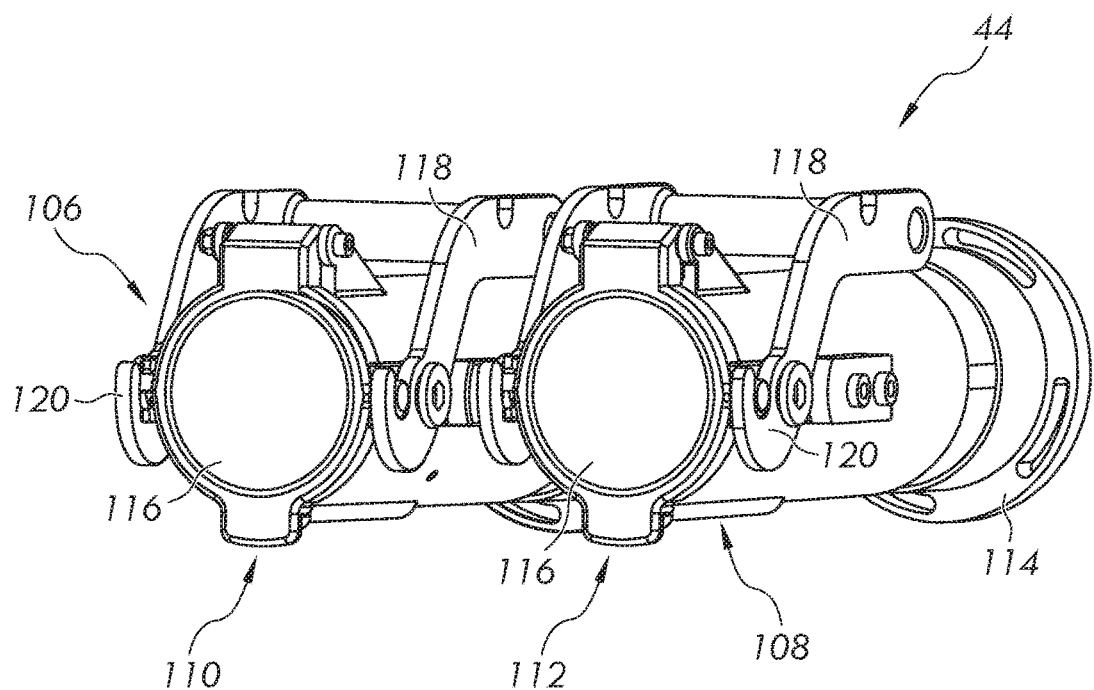
FIG. 7 is an elevational perspective view of an electrical coupler operatively coupled to an implement coupler.

As shown in FIG. 7, each of the electrical couplers 106 and 108 includes respectively a front end 110 and a front end 112. A rear end 114 of coupler 108 defines an input configured to receive the electrical cable connecting the generator to the electrical coupler. A rear end 115 of coupler 110 is configured to receive the electrical cable connected to the other generator. The rear ends of each of the couplers 106 and 108 are also illustrated in FIG. 5. The front ends 108 and 110 each include a cap 116 which encloses an output connector of the coupler which provides a location for the access to electrical power provided by one of the generators. The cap 116 is held in place when the coupler is not being used by an arm 118 which rotates about an axis 120 to secure the cap 116 in place. Movement of the arm 118 from the illustrated location about the axis 120 in a counterclockwise direction, as illustrated, enables the cap 116 to be opened for access to the provided electrical power.

In other embodiments, the electrical coupler 44 takes different forms, sizes, shapes, and numbers of input and outputs to accommodate the requirements of the attached implement. Consequently, the electrical coupler 44 is not limited to electrical couplers 106 and 108 and other configurations are contemplated including a single electrical socket, the absence of a cap, the absence of an arm, and different types of housings to accommodate one or more electrical sockets. In other embodiments, the electrical coupler 44 includes a communication connector having an input operatively connected to the work vehicle's electrical system such as a CAN (controller area network) bus to transmit command signals to the implement. In different embodiments, the communication connector is operatively connected to an implement traction device, a powered axle drive, or to other functions provided by the implement that require control functions provided by the operator. In one embodiment, the communication connector is provided at the electrical coupler 44.

Figure 8:
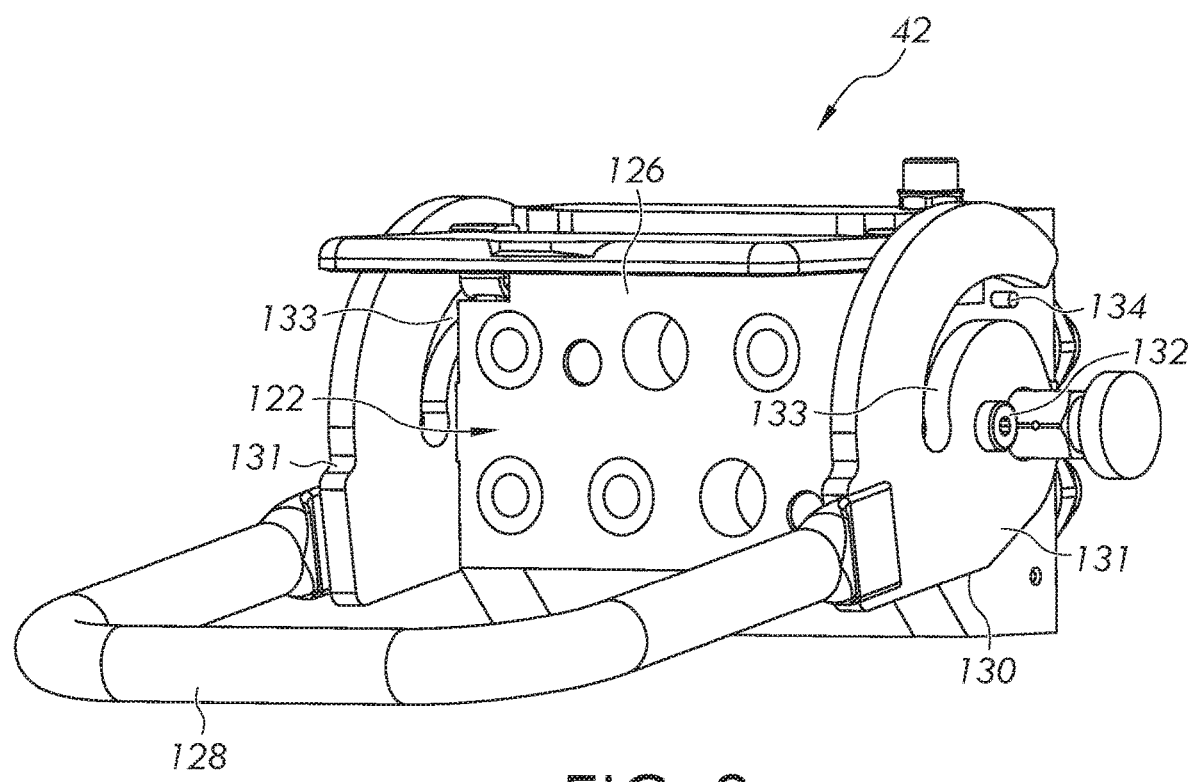
FIG. 8 is an elevational perspective view of a line coupler operatively coupled to an implement coupler.

The line coupler 42 of FIG. 8 provides a plurality of connectors 122, each of which is configured to provide a connection for a hose configured to provide or deliver a material including one of a liquid or a gas, such as air. For instance, in one embodiment the liquid is a hydraulic liquid, or fluid, used to hydraulically drive one or more hydraulic functions provided by the implement. In the case of a hydraulic function, the control of such a function in different embodiments is located within the cab 18 at the user interface 27 or at the implement. In other embodiments, the gas, such as air, and is used to pneumatically drive one or more air operated functions provided by the implement. A front side 126 of the coupler 42 provides access to the appropriate coupler which is coupled to the source liquid or gas. In one embodiment, the back side 124 is configured to receive the material and the front side 126 is configured to deliver the material to the appropriate line dedicated to providing an implement function.

A handle 128 is rotatably coupled to a housing 130 of the coupler at an axis of rotation 132. Movement of the handle 128 from the illustrated position in a clockwise direction seats and holds connectors to the housing 130 for delivery of the gas or liquid. The connectors, in different embodiments, are provided at terminating ends of conduits to provide the air or liquid to the implement.

The handle 128 terminates at plates 131, each of which includes an arcuate slot 133, which engages a pin 134. As the handle 128 is moved in the clockwise direction as illustrated, the slot 133 moves along the pin 134 to lock the connectors in place to the appropriate conduit 122.

While the illustrated embodiments show a first generator 86 and a second generator 88, the present disclosure is not limited to two generators. In other embodiments, one or three or more generators are contemplated. In addition, it is contemplated that the number of electrical couplers is not limited to the first and second electrical couplers 106 and 108 as illustrated. In other embodiments, one or three or more electrical couplers are contemplated. In addition, while each of the illustrated electrical couplers is configured to couple to a single generator, in other embodiments, multiple generators are coupled to a single electrical coupler and a switch enables an operator to switch between generators. In this and other embodiments, the switchable electrical coupler is switched from one generator to another to access a different amount of electrical power, such that the appropriate amount of power required by the implement is provided.

The present disclosure provides an off-board power and implements coupler that provides mechanical power, hydraulic power, and electrical power for different types of implements. In this way, the implement coupler 32 is configured to power implements manufactured by different manufacturers which can have different power requirements. Since the implement coupler 32, in different embodiments, supports a plurality of generators, the selection of the plurality generators can be tailored to the specific implement being powered. In this way, the disclosed implement coupler provides electrical power for different types of implements, such that implements having different power requirements are accommodated by a single implement coupler.

The embodiments disclose herein and either taught or suggested are particularly advantageous, since work vehicle systems, i.e. tractor systems, are being challenged to provide an integrated solution for implements. When considering the various vehicle architectures and space constraints, integrating the generators and associated drive components into the quick connect implement coupler would provide a solution that is useful throughout all of the work vehicle families with this need. The disclosed coupler is also easily removable when not in use, or could remain on the work vehicle and switched off, thereby eliminating all potential parasitic losses. The coupler also keeps all higher voltage couplers, cables and associated clutter off the work vehicle and can be scaled for the required power by adding or subtracting generators. To improve integration of work vehicle with the implement coupler, the work vehicle can be designed to be "generator ready". The necessary low-temperature cooling system and vehicle controls for controlling the operations of the implement are included on the work vehicle to allow a customer to simply connect the coupler and begin operations.

While exemplary embodiments incorporating the principles of the present disclosure have been described hereinabove, the present disclosure is not limited to the described embodiments. Instead, this application is intended to cover any variations, uses, or adaptations of the disclosure using its general principles. In addition, while the terms greater than and less than have been used in making comparison, it is understood that either of the less than or greater than determines can include the determination of being equal to a value. Further, this application is intended to cover such departures from the present disclosure as come within known or customary practice in the art to which this disclosure pertains and which fall within the limits of the appended claims.

The invention claimed is:

1. An implement coupler for a work vehicle including a power takeoff configured to provide a mechanical force and an adjustment mechanism to adjust the position of the implement coupler with respect to the work vehicle, the implement coupler comprising:
    a support frame;
    a drive shaft supported by the support frame, the drive shaft including an input to couple to the power takeoff; wherein the drive shaft is configured to transfer mechanical force provided by the power takeoff;
    a generator supported by the support frame and operatively connected to the drive shaft, wherein the generator is configured to generate electrical power based on the mechanical force provided through the drive shaft; and
    an input drive operatively connected to the generator and to the drive shaft, wherein movement of the input drive responsive to movement of the drive shaft causes the generator to generate the electrical power.

2. The implement coupler of claim 1 further comprising a plurality of implement couplers connected to the support frame, wherein the implement couplers connect to a work implement.

3. The implement coupler of claim 2 further comprising a plurality of link couplers connected to the support frame, wherein the link couplers connect to the adjustment mechanism of the work vehicle.

4. The implement coupler of claim 1 further comprising an electrical coupler operatively connected to the support frame and electrically coupled to the generator, wherein the electrical coupler includes an output configured to provide access to the generated electrical power.

5. The implement coupler of claim 4 further comprising a line coupler operatively connected to the support frame, wherein the line coupler includes a connector configured to couple to a delivery line configured to deliver one of a gas and a liquid.

6. The implement coupler of claim 5 further comprising a second generator supported by the support frame, wherein the second generator is configured to generate electrical power based on the mechanical force provided by the drive shaft.

7. The implement coupler of claim 6 further comprising a gear assembly operatively connected to the drive shaft, the first generator, and the second generator, wherein the gear assembly drives each of the first generator and the second generator.

8. The implement coupler of claim 7 wherein the gear assembly includes a drive gear, a first driven gear coupled to the first generator, and a second driven gear coupled to the second generator.

9. The implement coupler of claim 7 wherein the gear assembly is configured to drive the first generator at a first speed and to drive the second generator at a second speed such that the electrical power generated by the first generator is different from the electrical power generated by the second generator.

10. The implement coupler of claim 7 wherein the first generator generates a first electrical power and the second generator generates a second electrical power, and wherein the first electrical power and the second electrical power are the same electrical power or different electrical powers.

11. An implement coupler for a work vehicle including a power takeoff configured to provide a mechanical force and an adjustment mechanism to adjust the position of the implement coupler with respect to the work vehicle, the implement coupler comprising:
    a support frame;
    a gear assembly supported by the support frame and operatively connected to the power takeoff, the gear assembly configured for movement in response to the mechanical force provided by the power takeoff;
    a first generator supported by the support frame and operatively connected to the gear assembly, wherein the first generator generates a first electrical power in response to movement of the gear assembly; and
    a second generator supported by the support frame and operatively connected to the gear assembly, wherein the second generator generates a second electrical power in response to movement of the gear assembly.

12. The implement coupler of claim 11 further comprising a plurality of implement couplers connected to the support frame, wherein the implement couplers connect to a work implement.

13. The implement coupler of claim 12 further comprising a plurality of link couplers connected to the support frame, wherein the link couplers connect to the adjustment mechanism of the work vehicle.

14. The implement coupler of claim 11 further comprising a drive shaft supported by the support frame, the drive shaft including an input to couple to the power takeoff; wherein the drive shaft is configured to transfer mechanical force provided by the power takeoff to the gear assembly.

15. The implement coupler of claim 14 wherein the gear assembly includes a generator drive gear operatively connected to the drive shaft, a first driven gear engaged with the generator drive gear and operatively connected to the first generator to generate the first electrical power, and a second driven gear engaged with the generator drive gear and operatively connected to the second generator to generate the second electrical power.

16. The implement coupler of claim 15 further comprising a first electrical coupler connected to the first generator to provide the first electrical power to an implement and a second electrical coupler connected to the second generator to provide the second electrical power to the implement.

17. The implement coupler of claim 16 wherein the gear assembly is configured to drive the first generator at a first speed and the second generator at a second speed such the first electrical power generated by the first generator is different from the second electrical power generated by the second generator.

18. A method of generating electrical power for a work implement connected to a work vehicle having an adjustment mechanism and a power takeoff, the method comprising:

receiving a rotational mechanical force provided by the power takeoff at a gear assembly of an implement coupler having connectors coupled to the adjustment mechanism;

generating in response to the received rotational mechanical force a first electrical power at a first generator located at the implement coupler and coupled the gear assembly;

generating in response to the received rotational mechanical force a second electrical power at a second generator located at the implement coupler and coupled to the gear assembly; and providing the first electrical power and the second electrical power to the work implement though respective first and second power connectors connected to the work implement.

19. The method of claim 18 wherein the second generating step comprises generating a second electrical power different from the first electrical power generated in the first generating step.

* * * * *